(12) United States Patent
Kashiwai et al.

(10) Patent No.: US 10,391,991 B2
(45) Date of Patent: Aug. 27, 2019

(54) ELECTRIC AUTOMOBILE BRAKING DEVICE

(71) Applicant: HONDA MOTOR CO., LTD., Minato-Ku, Tokyo (JP)

(72) Inventors: Mikio Kashiwai, Wako (JP); Makoto Tanaka, Wako (JP); Mitsuyasu Ino, Wako (JP); Masaru Nakayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 7 days.

(21) Appl. No.: 15/831,940

(22) Filed: Dec. 5, 2017

(65) Prior Publication Data
US 2018/0201246 A1    Jul. 19, 2018

(30) Foreign Application Priority Data
Jan. 18, 2017  (JP) ................................ 2017-006515

(51) Int. Cl.
| | |
|---|---|
| *B60T 13/58* | (2006.01) |
| *B60T 13/74* | (2006.01) |
| *B60T 8/50* | (2006.01) |
| *B60T 13/14* | (2006.01) |
| *B60T 1/10* | (2006.01) |
| *B60T 7/04* | (2006.01) |
| *B60T 13/66* | (2006.01) |
| *B60T 13/68* | (2006.01) |
| *F16D 61/00* | (2006.01) |
| *B60T 8/44* | (2006.01) |

(52) U.S. Cl.
CPC .................. *B60T 8/50* (2013.01); *B60T 1/10* (2013.01); *B60T 7/042* (2013.01); *B60T 13/142* (2013.01); *B60T 13/146* (2013.01); *B60T 13/586* (2013.01); *B60T 13/662* (2013.01); *B60T 13/686* (2013.01); *B60T 13/745* (2013.01); *F16D 61/00* (2013.01); *B60T 8/442* (2013.01)

(58) Field of Classification Search
CPC ............... B60T 13/586; B60T 2270/60; B60T 2270/604; B60T 1/10; B60T 7/042; B60T 8/50; B60T 13/142; B60T 13/16; B60T 13/161; B60T 13/662; B60T 13/686; B60T 13/745; B60L 7/10; B60L 7/18; B60L 7/24; B60L 7/26
USPC .................................................. 303/151, 152
See application file for complete search history.

(56) References Cited

U.S. PATENT DOCUMENTS

| | | | | |
|---|---|---|---|---|
| 6,120,115 | A * | 9/2000 | Manabe | .................... B60T 8/00 303/152 |
| 9,238,412 | B2 * | 1/2016 | Kidston | .................... B60L 7/26 |
| 2010/0042280 | A1 * | 2/2010 | Cominetti | .............. B62K 11/04 701/22 |

FOREIGN PATENT DOCUMENTS

JP          2013-005485 A     1/2013

* cited by examiner

*Primary Examiner* — Thomas J Williams
(74) *Attorney, Agent, or Firm* — Carrier Blackman & Associates, P.C.; Joseph P. Carrier; Jeffrey T. Gedeon

(57) ABSTRACT

An electric automobile braking device includes a master cylinder that has no vacuum booster and a hydraulic booster device that can increase a brake fluid pressure generated by the master cylinder. Switching is possible between a normal braking mode in which hydraulic braking and regenerative braking are used in combination when a percentage charge of a battery is less than a threshold value and a regenerative braking restriction mode in which hydraulic braking is permitted and regenerative braking is restricted when the percentage charge is a threshold value or greater. In the regenerative braking restriction mode, when a depressing force of a brake pedal by a driver exceeds a first depressing force over a predetermined period of time, an operation of the hydraulic booster device is suppressed.

12 Claims, 8 Drawing Sheets

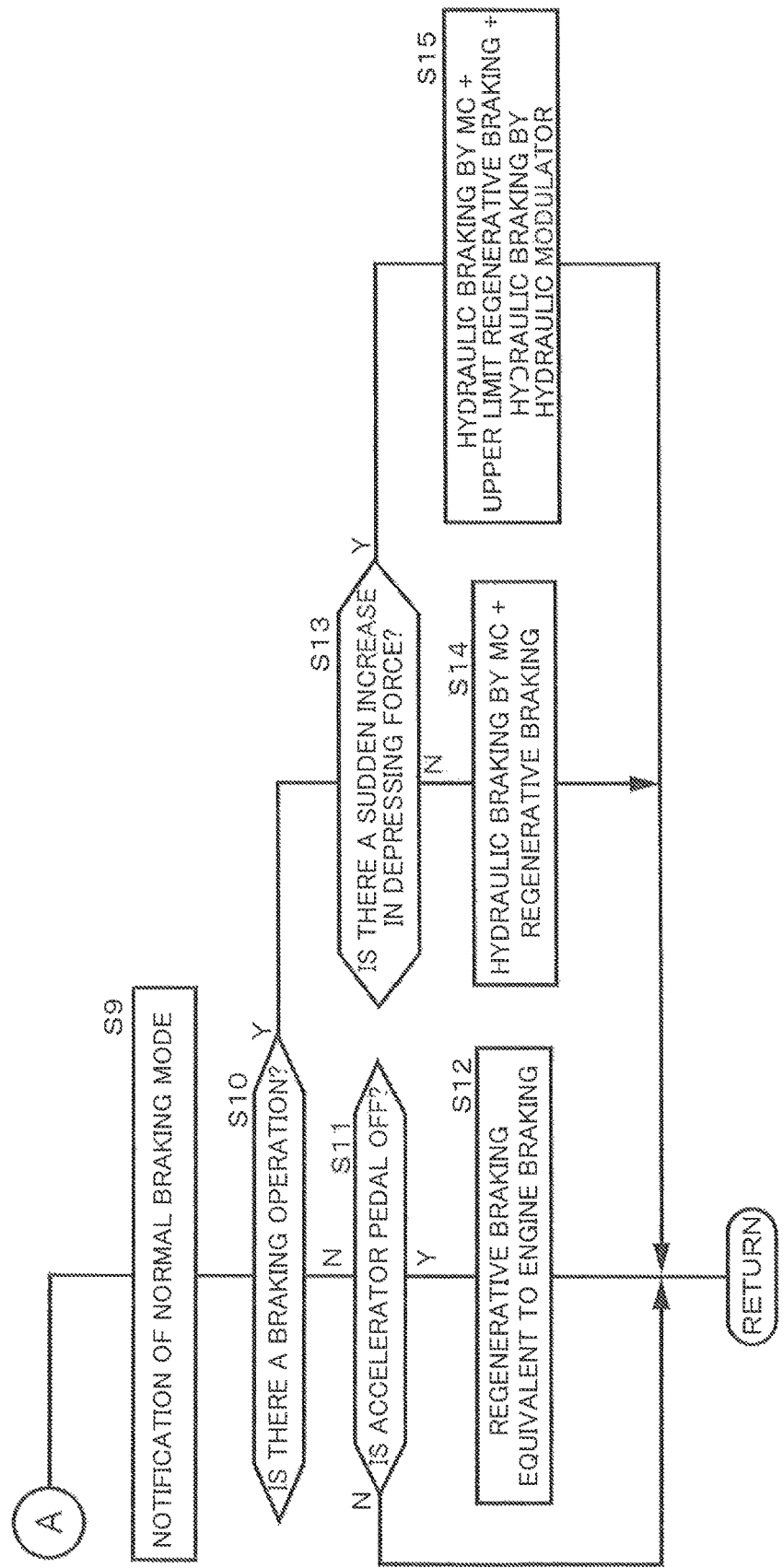

ELECTRIC AUTOMOBILE BRAKING DEVICE

CROSS REFERENCE TO RELATED APPLICATIONS

The present application claims priority under 35 U.S.C. § 119 to Japanese Patent Application No. 2017-6515 filed Jan. 18, 2017 the entire contents of which are hereby incorporated by reference.

BACKGROUND OF THE INVENTION

Field of the Invention

The present invention relates to an electric automobile braking device comprising a master cylinder to which a depressing force of a brake pedal by a driver is transmitted without being boosted and that generates a brake fluid pressure, and a hydraulic booster device that can increase the brake fluid pressure generated by the master cylinder with a brake fluid pressure generated by an electric oil pump.

Description of the Related Art

When the place where a battery of an electric automobile is charged by an external power source is a high altitude place, and after the battery is fully charged the automobile travels on a downward slope over a long period of time, since the battery cannot be charged any further, the electric motor cannot carry out regenerative braking, potential energy that should have been recovered by regenerative braking is consumed wastefully, and there is the problem that the cost of charging by an external power source increases.

Japanese Patent Application Laid-open No. 2013-5485 has made known an arrangement in which, when the battery is charged by an external power source, the upper limit for the percentage charge of the battery is decreased from the default value (100%) by touching and operating a liquid crystal display screen of a navigation device, thus leaving room for charging the battery by regenerative braking when traveling on a downward slope after charging, and thereby enabling regenerative braking to be carried out so as to enhance the efficiency with which energy is recovered.

However, in a small electric automobile, in order to simplify the structure of a brake device, a vacuum booster, which is a servo unit for a master cylinder, is sometimes eliminated. In this case, in order to compensate for a shortfall in the brake fluid pressure generated by the master cylinder, utilizing an existing hydraulic modulator that can adjust the braking forces for the four wheels individually in order that a function of increasing the brake fluid pressure is exhibited could be considered.

In this way, when a vehicle that is not equipped with a vacuum booster but is equipped with a hydraulic modulator continuously descends a long downward slope, if the battery attains a fully charged state and regenerative braking is disabled, the hydraulic modulator is operated at a high frequency in order to compensate for a shortfall in the brake fluid pressure; if a hydraulic modulator with a simple structure is employed, there is a possibility that the fluid pressure generated by an electric oil pump when the hydraulic modulator is operated will be transmitted to a brake pedal and the brake feeling will be degraded. It is therefore desirable that the frequency with which the hydraulic modulator is operated is as low as possible, thus minimizing any degradation in the brake feeling.

SUMMARY OF THE INVENTION

The present invention has been accomplished in light of the above circumstances, and it is an object thereof to minimize any degradation in brake feeling by making the frequency of operation of an electric automobile hydraulic booster device that assists a master cylinder having no vacuum booster as low as possible.

In order to achieve the object, according to a first aspect of the present invention, there is provided an electric automobile braking device comprising a master cylinder to which a depressing force of a brake pedal by a driver is transmitted without being boosted and that generates a brake fluid pressure, and a hydraulic booster device that can increase the brake fluid pressure generated by the master cylinder with a brake fluid pressure generated by an electric oil pump, wherein switching is possible between a normal braking mode in which hydraulic braking and regenerative braking are used in combination when a percentage charge of a battery connected to an electric motor for traveling is less than a threshold value and a regenerative braking restriction mode in which hydraulic braking is permitted and regenerative braking is restricted when the percentage charge of the battery is a threshold value or greater, and in the regenerative braking restriction mode, when the depressing force of the brake pedal by the driver exceeds a first depressing force over a predetermined period of time, an operation of the hydraulic booster device is suppressed.

In accordance with the first aspect, the electric automobile braking device includes the master cylinder, to which the depressing force of the brake pedal by the driver is transmitted without being boosted and which generates a brake fluid pressure, and the hydraulic booster device, which can increase the brake fluid pressure generated by the master cylinder with a brake fluid pressure generated by the electric oil pump. Since switching is possible between the normal braking mode, in which hydraulic braking and regenerative braking are used in combination when the percentage charge of the battery connected to the electric motor is less than a threshold value, and the regenerative braking restriction mode, in which hydraulic braking is permitted and regenerative braking is restricted when the percentage charge of the battery is a threshold value or greater, when the place where the battery of the electric automobile is charged by an external power source is a high altitude place and the automobile travels on a downward slope for a long period of time after the battery is fully charged, the shortfall in the braking force due to the regenerative braking being suppressed can be compensated for by brake fluid pressure generated by the hydraulic booster device while preventing overcharging of the battery by the regenerative braking restriction mode. Moreover, since in the regenerative braking restriction mode when the depressing force of the brake pedal by the driver exceeds the first depressing force over a predetermined period of time the operation of the hydraulic booster device is suppressed, it is possible to prevent degradation in brake feeling due to excessive operation of the hydraulic booster device, generation of operating noise from the hydraulic booster device, and increase in power consumption of the hydraulic booster device.

According to a second aspect of the present invention, in addition to the first aspect, while the operation of the hydraulic booster device is being suppressed, the operation of the hydraulic booster device is gradually suppressed until the depressing force of the brake pedal by the driver attains a second depressing force that is greater than the first depressing force.

In accordance with the second aspect, since while the operation of the hydraulic booster device is being suppressed, the operation of the hydraulic booster device is gradually suppressed until the depressing force of the brake pedal by the driver attains the second depressing force, which is greater than the first depressing force, not only is it possible to eliminate a disagreeable sensation for the driver by preventing a sudden decrease in the brake fluid pressure generated by the hydraulic booster device, but it is also possible to prevent the brake fluid pressure, generated by the hydraulic booster device when the required braking force increases, from excessively decreasing, thus making it possible to prevent the burden on the driver's operation of depressing the brake pedal from increasing.

According to a third aspect of the present invention, in addition to the second aspect, while the operation of the hydraulic booster device is being suppressed, the suppression of operation of the hydraulic booster device is released when the depressing force of the brake pedal by the driver attains a third depressing force that is greater than the second depressing force.

In accordance with the third aspect, since while the operation of the hydraulic booster device is being suppressed, the suppression of operation of the hydraulic booster device is released when the depressing force of the brake pedal by the driver attains the third depressing force, which is greater than the second depressing force, it is possible to generate a sufficient brake fluid pressure by operating the hydraulic booster device when a large braking force is required, thereby enabling a required braking force to be ensured.

According to a fourth aspect of the present invention, in addition to any one of the first to third aspects, there is provided the electric automobile braking device, further comprising a notification device that notifies the driver of a shift from the normal braking mode to the regenerative braking restriction mode.

In accordance with the fourth aspect, since there is provided the notification device for notifying the driver of a shift from the normal braking mode to the regenerative braking restriction mode, when there is a shift from the normal braking mode to the regenerative braking restriction mode, even if regenerative braking is not carried out and the brake feeling changes, it is possible, by notifying the driver of this in advance, to prevent a disagreeable sensation from occurring.

According to a fifth aspect of the present invention, in addition to any one of the first to fourth aspects, there is provided the electric automobile braking device, further comprising a notification device that notifies the driver of a shift from the regenerative braking restriction mode to the normal braking mode.

In accordance with the fifth aspect, since there is provided the notification device for notifying the driver of a shift from the regenerative braking restriction mode to the normal braking mode, when there is a shift from the regenerative braking restriction mode to the normal braking mode, even if regenerative braking starts to be carried out and the brake feeling changes, it is possible, by notifying the driver of this in advance, to prevent a disagreeable sensation from occurring.

Note that a hydraulic modulator H of an embodiment corresponds to the hydraulic booster device of the present invention, and first and second electric oil pumps 19A and 19B of the embodiment correspond to the electric oil pump of the present invention.

The above and other objects, characteristics and advantages of the present invention will be clear from detailed descriptions of the preferred embodiment which will be provided below while referring to the attached drawings.

BRIEF DESCRIPTION OF THE DRAWINGS

FIG. 8 is a flowchart (second section) for explaining the regenerative braking restriction mode and the normal mode.

DESCRIPTION OF THE PREFERRED EMBODIMENT

An embodiment of the present invention is explained below by reference to FIG. 1 to FIG. 8.

Figure 1:
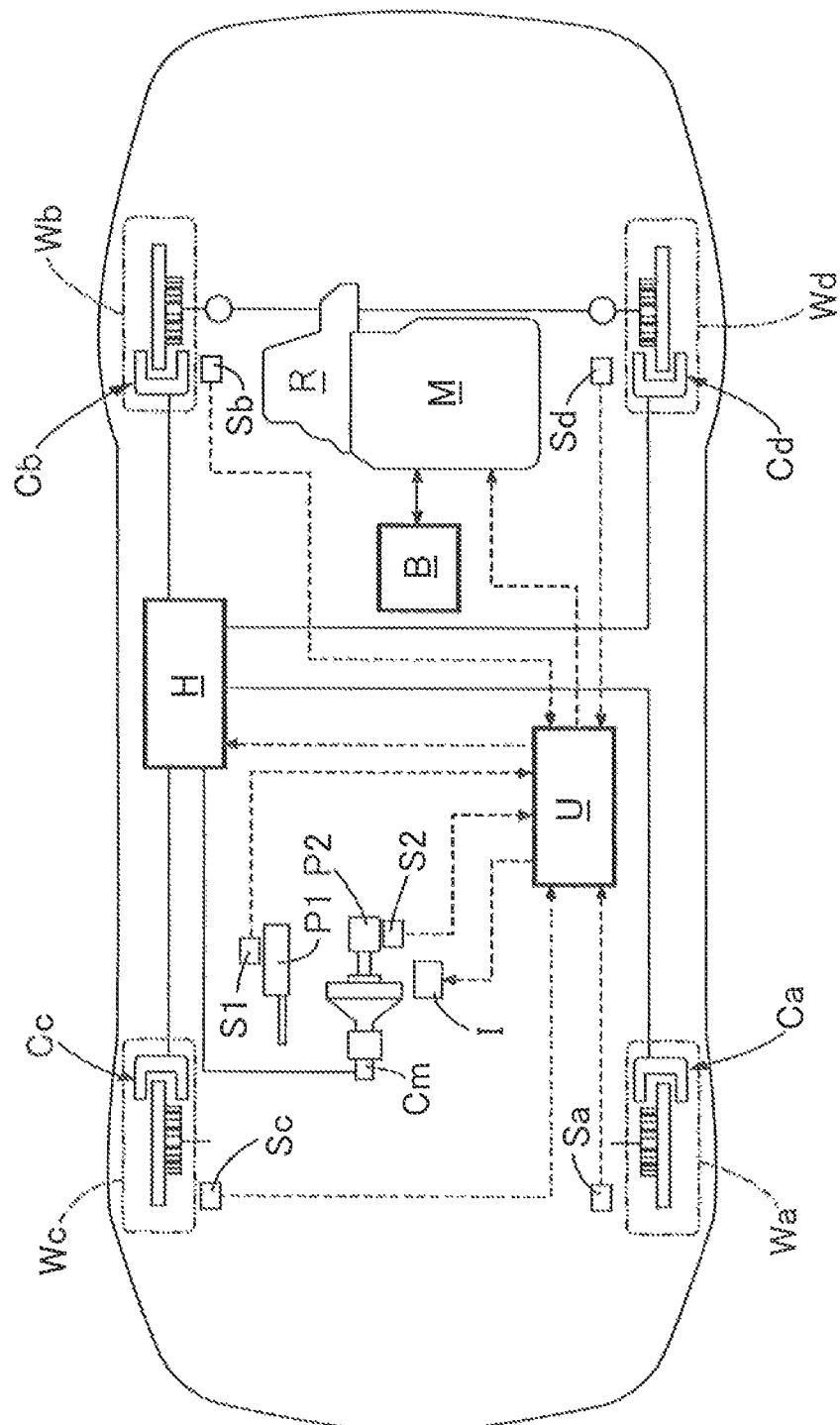
FIG. 1 is a view showing the overall arrangement of an electric automobile equipped with a braking device.

As shown in FIG. 1, a vehicle of the present embodiment includes left and right front wheels Wa and Wc, which are follower wheels, and left and right rear wheels Wd and Wb, which are driven wheels, the left and right rear wheels Wd and Wb being driven by an electric motor M, which is a drive source, via a reduction gear R. The electric motor M is driven by electric power stored in a battery B, and the battery B is charged by electric power generated by regenerative braking of the electric motor M.

A master cylinder Cm that is operated by a brake pedal P2 and generates brake fluid pressure is connected to left and right front wheel brake calipers Ca and Cc and left and right rear wheel brake calipers Cd and Cb via a hydraulic modulator H having an electric oil pump installed therewithin. The master cylinder Cm is of a boosterless type that does not have a vacuum booster, which is a servo unit, and is operated only by a driver's depressing force inputted into the brake pedal P2.

The hydraulic modulator H can control the braking force for the four wheels individually by freely increasing or decreasing the brake fluid pressure generated by the master cylinder Cm and supplying it to the left and right front wheel brake calipers Ca and Cc and the left and right rear wheel brake calipers Cd and Cb, and carries out anti-lock control in which wheel lock when braking is suppressed, traction control in which wheel slip when accelerating is suppressed, lateral slip prevention control in which lateral slip when turning is suppressed, assistance control in which brake fluid pressure generated by the master cylinder Cm is increased, etc.

Connected to an electronic control unit U that controls the brake fluid pressure outputted by the hydraulic modulator H and regenerative torque of the electric motor M are accelerator opening degree detection means S1 that detects the amount of operation of an accelerator pedal P1, amount of brake operation detection means S2 that detects the brake fluid pressure generated by the master cylinder Cm from the depressing force of the brake pedal P2, wheel speed detection means Sa and Sc that detect the wheel speed of the left and right front wheels Wa and Wc, wheel speed detection means Sd and Sb that detect the wheel speed of the left and right rear wheels Wd and Wb, and a notification device I for informing the driver of switching between a normal mode and a regenerative braking restriction mode, which are describe later. The notification device I is formed from image display means provided on a meter panel and sound generation means such as a speaker, a chime, a buzzer, or the like.

Figure 2:
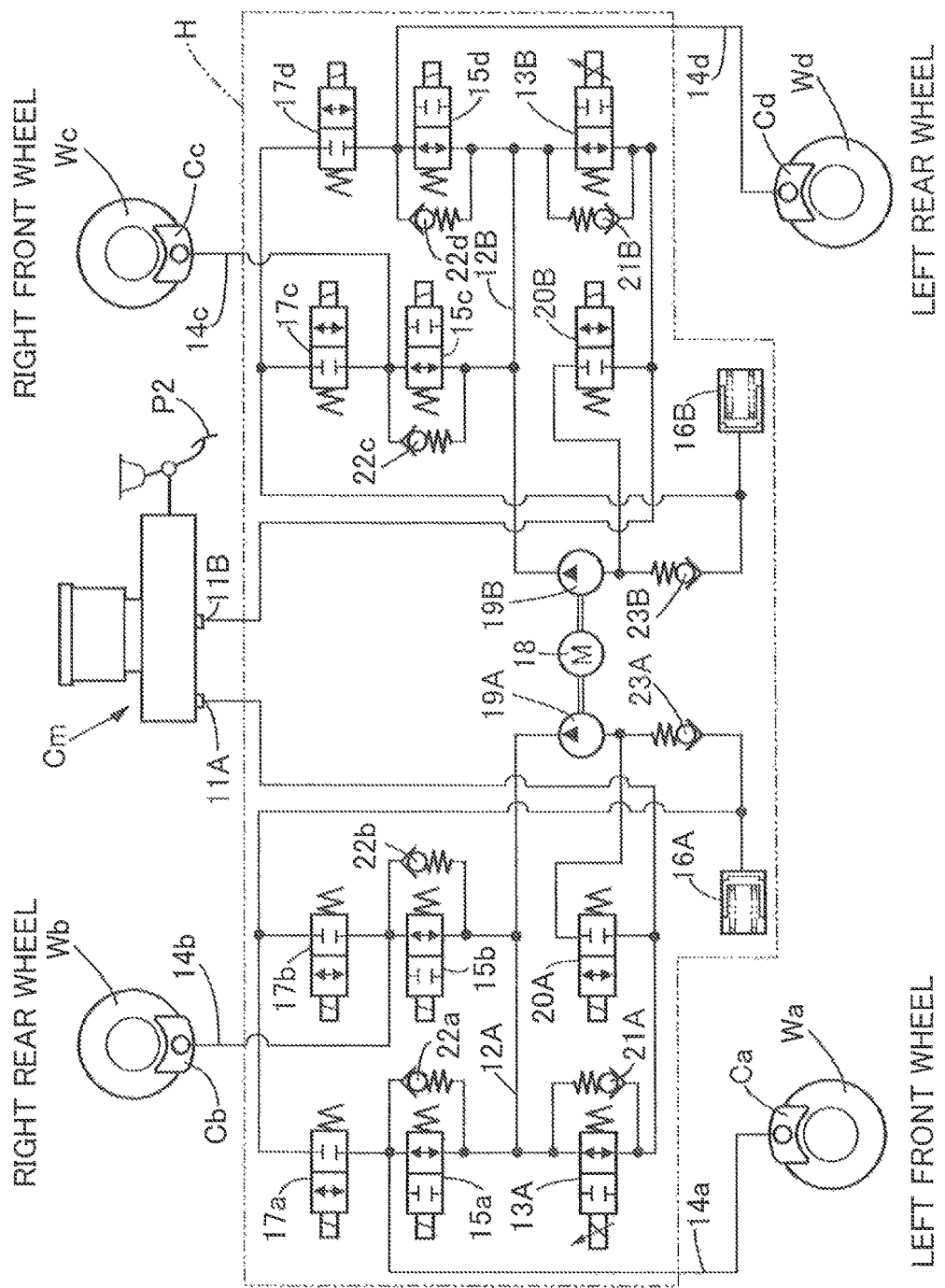
FIG. 2 is a hydraulic circuit diagram of the braking device.

As shown in FIG. 2, the master cylinder Cm includes a first output port 11A and a second output port 11B that output the same brake fluid pressure according to operation of the brake pedal P2, the first output port 11A and the second output port 11B being connected to the left and right front wheel brake calipers Ca and Cc and the left and right rear wheel brake calipers Cd and Cb via the hydraulic modulator H.

The hydraulic modulator H includes a first master cylinder-side fluid pressure path 12A that can be connected to the first output port 11A, a second master cylinder-side fluid pressure path 12B that can be connected to the second output port 11B, first and second regulator valves 13A and 13B disposed respectively between the first and second output ports 11A and 11B and the first and second master cylinder-side fluid pressure paths 12A and 12B, a normally open in valve 15a disposed between a wheel-side fluid pressure path 14a communicating with the left front wheel brake caliper Ca and the first master cylinder-side fluid pressure path 12A, a normally open in valve 15b disposed between a wheel brake-side fluid pressure path 14b communicating with the right rear wheel brake caliper Cb and the first master cylinder-side fluid pressure path 12A, a normally open in valve 15c disposed between a wheel brake-side fluid pressure path 14c communicating with the right front wheel brake caliper Cc and the second master cylinder-side fluid pressure path 12B, a normally open in valve 15d disposed between a wheel brake-side fluid pressure path 14d communicating with the left rear wheel brake caliper Cd and the second master cylinder-side fluid pressure path 12B, first and second reservoirs 16A and 16B individually corresponding to the first and second output ports 11A and 11B, normally closed out valves 17a and 17b disposed between the first reservoir 16A and the wheel brake-side fluid pressure paths 14a and 14b, normally closed out valves 17c and 17d disposed between the second reservoir 16B and the wheel brake-side fluid pressure paths 14c and 14d, first and second electric oil pumps 19A and 19B driven by a common electric motor 18 and having their discharge side connected to the first and second master cylinder-side fluid pressure paths 12A and 12B, first and second suction valves 20A and 20B disposed between the first and second output ports 11A and 11B and the suction side of the first and second electric oil pumps 19A and 19B, check valves 21A and 21B connected in parallel to the first and second regulator valves 13A and 13B, check valves 22a to 22d connected in parallel to the in valves 15a to 15d, and check valves 23A and 23B disposed between the first and second reservoirs 16A and 16B and the suction side of the first and second electric oil pumps 19A and 19B.

The first and second regulator valves 13A and 13B are normally open linear solenoid valves, can switch between providing and blocking communication between the first and second output ports 11A and 11B and the first and second master cylinder-side fluid pressure paths 12A and 12B, and can also operate so as to adjust the fluid pressure of the first and second master cylinder-side fluid pressure paths 12A and 12B.

The function of the hydraulic modulator H is now explained. Since the function of the first output port 11A-side hydraulic circuit of the master cylinder Cm is substantially the same as the function of the second output port 11B-side hydraulic circuit of the master cylinder Cm, the function of the first output port 11A-side hydraulic circuit is explained.

Figure 3:
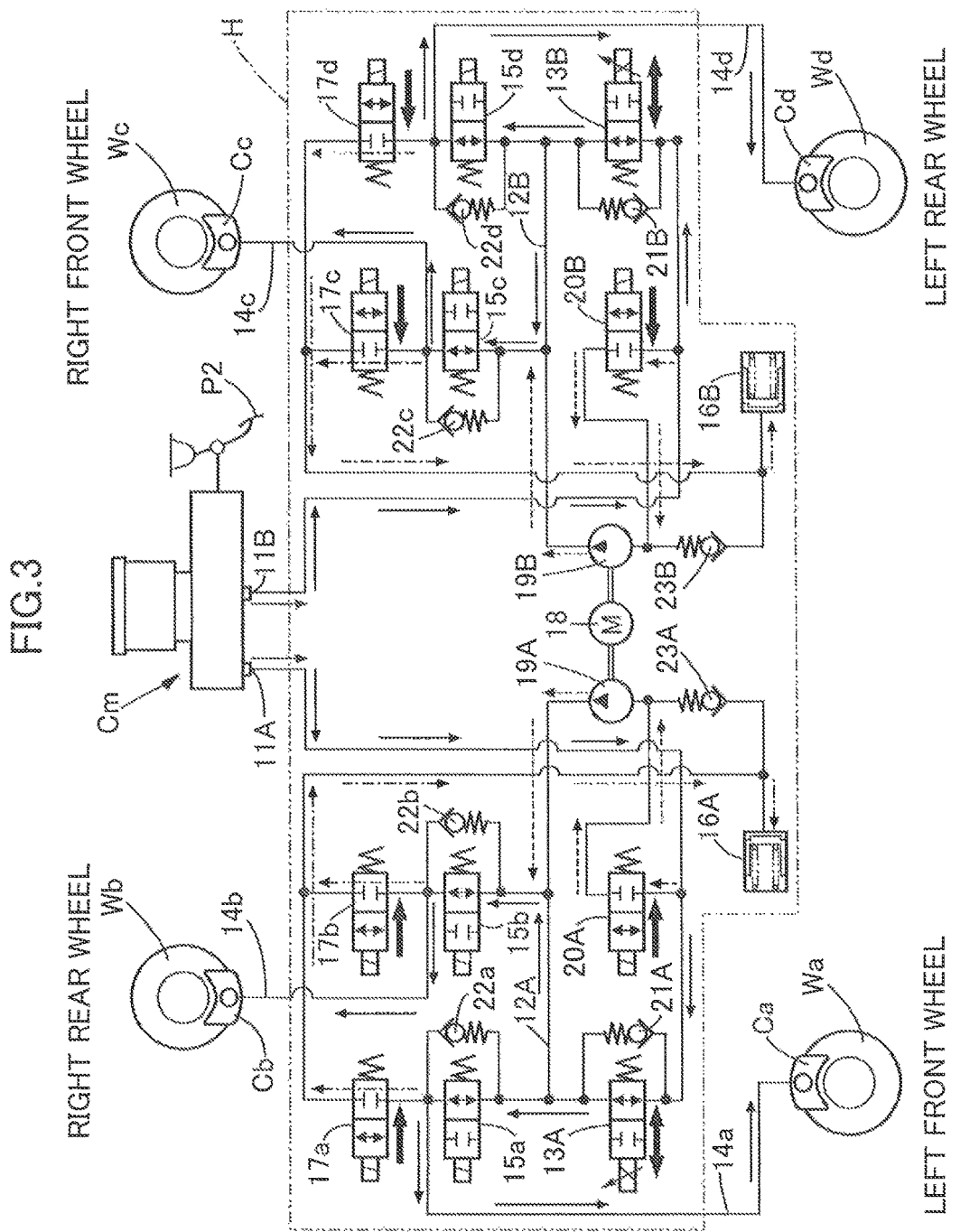
FIG. 3 is a diagram for explaining the operation corresponding to FIG. 2.

As shown in FIG. 3, brake fluid pressure generated by the master cylinder Cm when the driver depresses the brake pedal P2 is transmitted from the first output port 11A to the first master cylinder-side fluid pressure path 12A via the first regulator valve 13A, and is transmitted therefrom to the left front wheel brake caliper Ca via the in valve 15a and the wheel-side fluid pressure path 14a as well as from the first master cylinder-side fluid pressure path 12A to the right rear wheel brake caliper Cb via the in valve 15b and the wheel-side fluid pressure path 14b, and the left front wheel Wa and the right rear wheel Wb are braked with the same braking force (see solid line arrows).

In this process, if the first electric oil pump 19A is driven in a state in which the first suction valve 20A is energized and opened, since as shown by the broken line arrows brake fluid that has been sucked in from the master cylinder Cm via the first suction valve 20A is pressurized in the first electric oil pump 19A and supplied to the first master cylinder-side fluid pressure path 12A, the brake fluid pressure of the first master cylinder-side fluid pressure path 12A is higher than the brake fluid pressure generated by the master cylinder Cm. In this process, adjusting the degree of opening of the first regulator valve 13A so as to allow the brake fluid pressure of the first master cylinder-side fluid pressure path 12A to escape toward the suction side of the first electric oil pump 19A enables the brake fluid pressure of the first master cylinder-side fluid pressure path 12A to be controlled at any magnitude. Further, if the out valves 17a and 17b are energized and opened, since as shown by the chain line arrows the brake fluid pressure of the first master cylinder-side fluid pressure path 12A is allowed to escape to the first reservoir 16A, the brake fluid pressure of the first master cylinder-side fluid pressure path 12A can be made lower than the brake fluid pressure generated by the master cylinder Cm.

In this way, the hydraulic modulator H freely increases or decreases the brake fluid pressure generated by the master cylinder Cm, and even if the vacuum booster, which is a servo unit, is eliminated from the master cylinder Cm, it is possible, by utilizing the pressure increasing function of the hydraulic modulator H, to increase the brake fluid pressure generated by the master cylinder Cm and ensure that there is a required braking force when there is an emergency and sudden braking is necessary so as to avoid danger.

Figure 4:
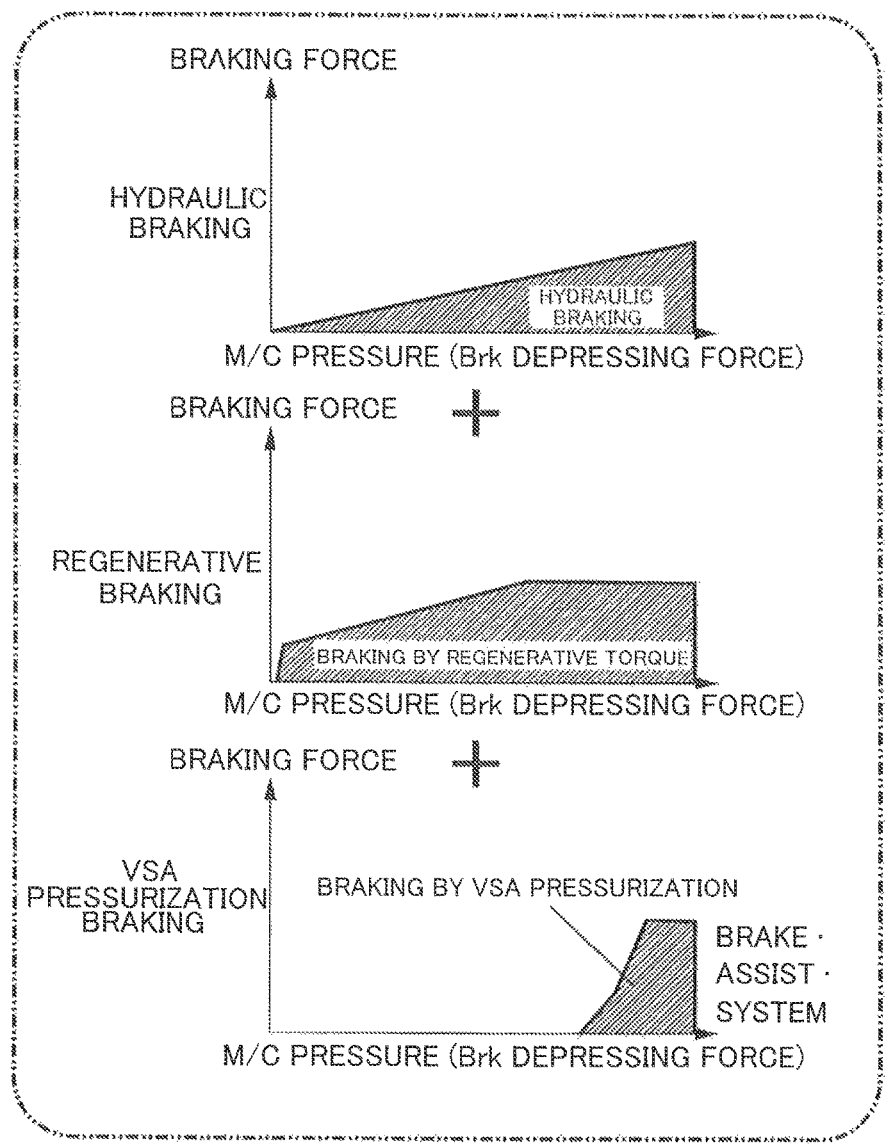
FIG. 4 is a diagram for explaining the operation of a hydraulic modulator when the situation is normal.

FIG. 4 explains the assistance function of the hydraulic modulator H described above, and shows the relationship between brake pedal P2 depressing force and braking force. At a time of normal operation, braking with regenerative torque that increases in response to the output value of the amount of brake operation detection means S2 detecting the brake fluid pressure generated by the master cylinder Cm due to the depressing force of the brake pedal P2 and the hydraulic braking that is operated by the brake fluid pressure generated by the master cylinder Cm are used in combination. With the hydraulic braking by the master cylinder Cm, which does not have a servo unit, it is necessary for the driver to increase the depressing force of the brake pedal P2, but in the present system regenerative torque is added to an insufficient braking force, thus enabling the braking force to be increased at a sufficiently high rate with respect to the increase in the depressing force.

Furthermore, the hydraulic modulator H carries out hydraulic assistance for the hydraulic braking when the depressing force of the brake pedal P2 increases rapidly, thereby enabling a necessary braking force to be obtained without increasing the burden on the driver's operation of the brake pedal P2 when there is an emergency. That is, at the time of an emergency when the amount of brake operation detection means S2 detects a sudden increase in the depressing force of the brake pedal P2, the hydraulic modulator H operates and generates a brake fluid pressure that is larger than the brake fluid pressure generated by the master cylinder Cm.

Moreover, the hydraulic modulator H can increase the braking force of a predetermined wheel by de-energizing and opening a predetermined one of the in valves 15a to 15d and de-energizing and closing a predetermined one of the out valves 17a to 17d, and can decrease the braking force of a predetermined wheel by energizing and closing a predetermined one of the in valves 15a to 15d and energizing and opening a predetermined one of the out valves 17a to 17d. It is therefore possible, by detecting a locked state or a slip state of each wheel from the wheel speed of the left and right front wheels Wa and Wc and the wheel speed of the left and right rear wheels Wd and Wb detected by the wheel speed detection means Sa, Sc, Sd, and Sb, to carry out anti-lock control in which the braking force of the wheel that has a tendency to lock is decreased to thus suppress locking, traction control in which the braking force of the wheel that has a tendency to slip is increased to thus suppress slip, or lateral slip prevention control in which lateral slip when turning is suppressed by generating a difference in braking force between a turning inner wheel and a turning outer wheel.

Since a vehicle employing the electric motor M for traveling as a drive source recovers kinetic energy of the vehicle body as electrical energy by carrying out regenerative braking with the electric motor M when decelerating, it is necessary to divide the required braking force between the braking force due to hydraulic braking and the braking force due to regenerative braking, and in this process increasing the proportion of the braking force due to regenerative braking as much as possible can improve the efficiency with which energy is recovered.

The upper limit value for the braking force due to regenerative braking is restricted by the capacity of the electric motor M, and when the battery B attains a nearly fully charged state, since the battery B cannot be charged further, the upper limit value for the braking force due to regenerative braking is restricted. Furthermore, since the kinetic energy of the vehicle body decreases in parallel with a decrease in the vehicle speed, the regenerative braking force that can be generated decreases at a time of low vehicle speed. The electronic control unit U carries out cooperative regenerative braking control in which the regenerative braking force that can be generated and that changes in response to the running conditions of the vehicle is computed, the braking force required by the driver is first covered by the regenerative braking force that can be generated, and the shortfall thereof is covered by hydraulic braking.

In this way, in order to enhance the efficiency with which energy is recovered by regenerative braking, if regenerative braking is carried out preferentially and any shortfall in the braking force is provided by hydraulic braking, when regenerative braking is carried out in a state in which the battery B is fully charged, the battery B will attain an overcharged state and the durability will be affected, and the preferential use of hydraulic braking is sometimes unavoidably necessary.

Figure 5:
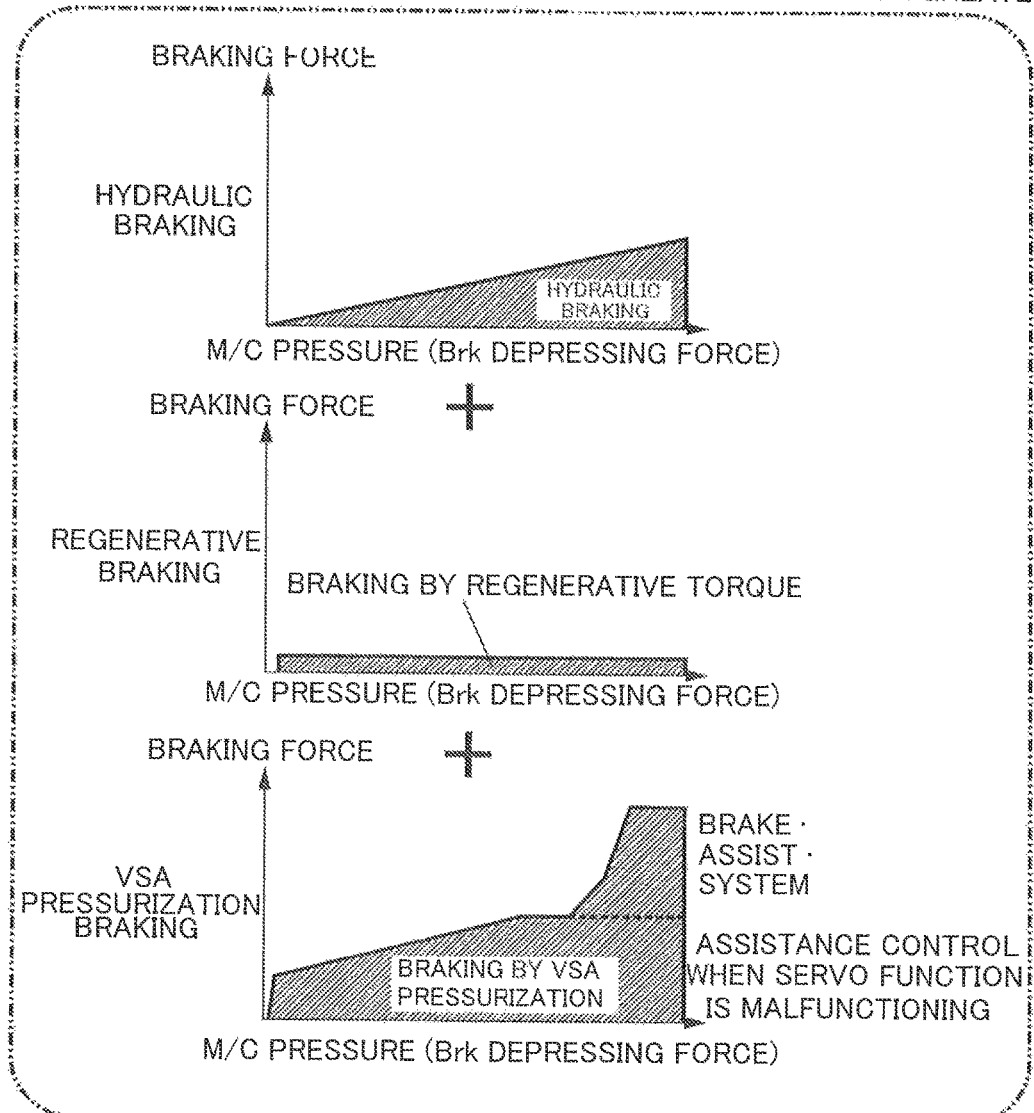
FIG. 5 is a diagram for explaining the operation of the hydraulic modulator when fully charged.
Figure 6:
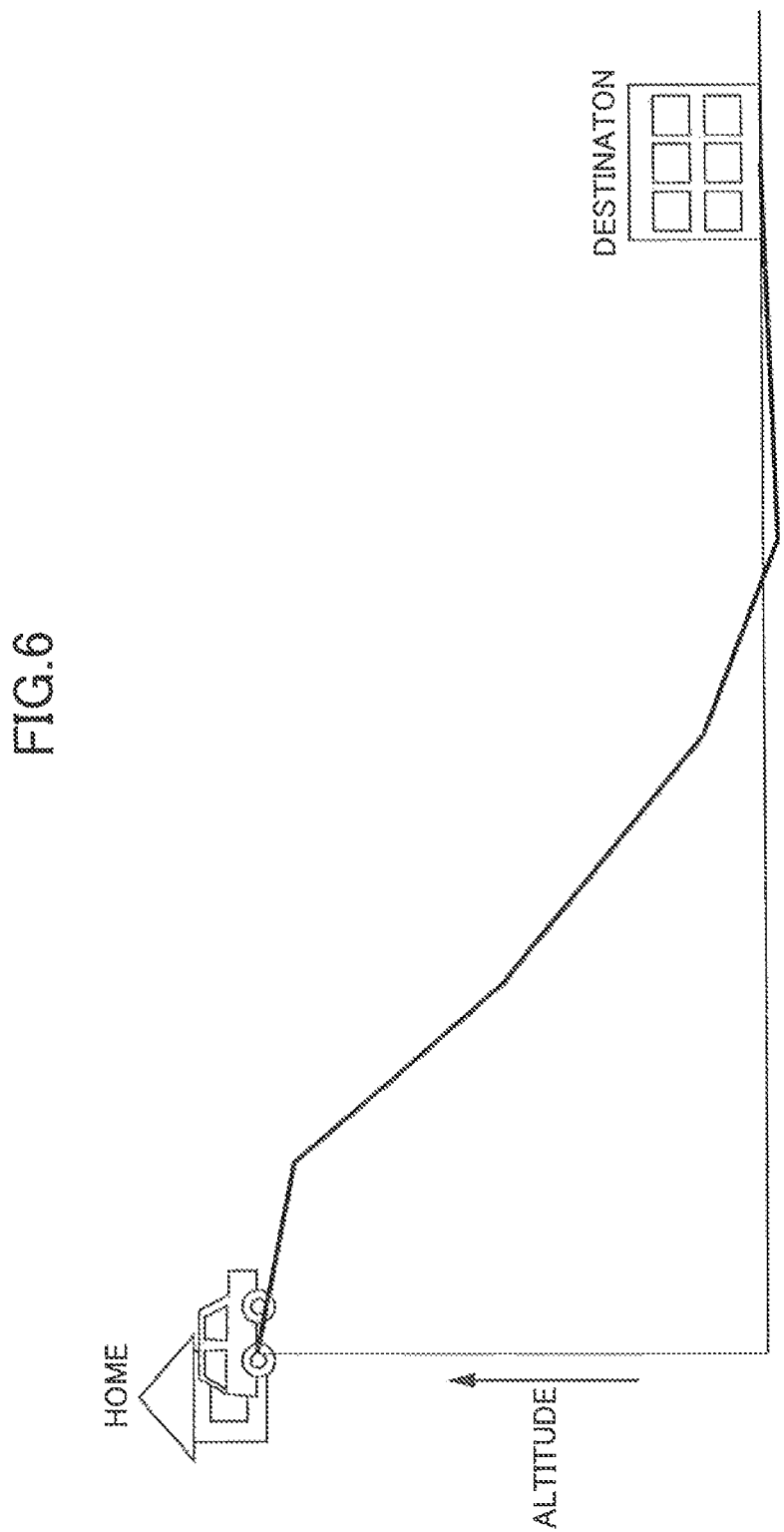
FIG. 6 is a diagram showing the relationship in altitude between a starting place and a destination for the electric automobile.

FIG. 5 explains the operation when the battery B is fully charged. For example, as shown in FIG. 6, when one's home is near the top of a long slope and the destination is near the bottom, the battery B is fully charged at home using a commercial external power source during the night, and next morning it moves to the destination by descending the long slope. In this case, since the battery B is in a fully charged state when starting, even though it travels on a downward slope regenerative braking cannot be carried out, and the shortfall in the braking force is compensated for by unavoidably carrying out hydraulic braking by the hydraulic modulator H.

However, when continuously descending a long slope while slightly depressing the brake pedal P2, the frequency of operation of the hydraulic modulator H becomes extremely high, not only is hydraulic kickback accompanying operation of the first and second electric oil pumps 19A and 19B of the hydraulic modulator H transmitted to the brake pedal P2 via the master cylinder Cm to thus degrade the brake feeling, but there are also the problems that the hydraulic modulator H generates operating noise and the power consumption of the hydraulic modulator H increases, which do not cause any problem at the normal operating frequency.

Figure 7:
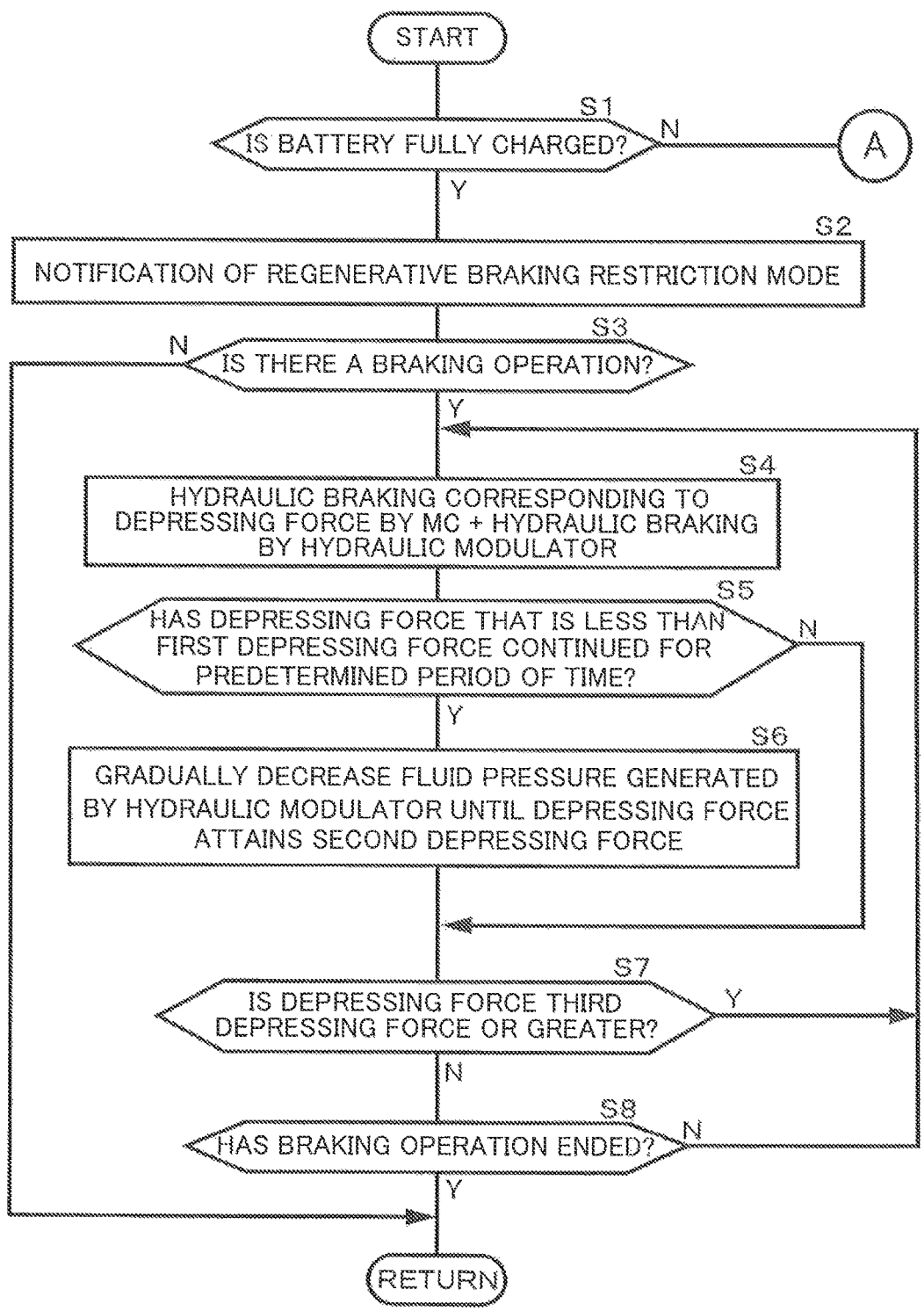
FIG. 7 is a flowchart (first section) for explaining a regenerative braking restriction mode and a normal mode.

FIG. 7 and FIG. 8 are flowcharts for explaining the operation of the hydraulic modulator H in order to solve the above problems; first, if in step S1 the battery B is in a fully charged state (e.g. percentage charge being 97% or greater) and regenerative braking of the electric motor M is restricted, then in step S2 the notification device I notifies the driver of the 'regenerative braking restriction mode'. Specifically, when there is a shift from the 'normal braking mode' to the 'regenerative braking restriction mode', the sound generation means is operated so as to notify the driver of the shift, and while the 'regenerative braking restriction mode' is established the image display means of the meter panel notifies the driver thereof. This makes it possible to prevent a disagreeable sensation from occurring by notifying the driver in advance of a change in brake feeling due to regenerative braking being carried out when there is a shift from the 'regenerative braking restriction mode' to the 'normal braking mode'.

If in the subsequent step S3 the driver depresses the brake pedal P2, in step S4 braking is started with the brake fluid pressure generated by the master cylinder Cm in response to the depressing force and the brake fluid pressure generated by the hydraulic modulator H. If in the subsequent step S5 a depressing force that is less than a first depressing force (e.g. 30 N), which is a threshold value, continues for a predetermined period of time (e.g. 5 sec), then in step S6 the brake fluid pressure generated by the hydraulic modulator H is gradually decreased. During this period, if the depressing force increases and attains a second depressing force (e.g. 40 N), which is a threshold value, the decrease in brake fluid pressure generated by the hydraulic modulator H is suspended, and the brake fluid pressure at that point is maintained. Even if the braking force decreases due to the brake fluid pressure generated by the hydraulic modulator H decreasing, a necessary braking force can be ensured without problems by the driver increasing the depression of the brake pedal P2 to thus increase the brake fluid pressure generated by the master cylinder Cm.

In either the case in which in step S5 a depressing force that is less than the first depressing force does not continue for the predetermined period of time and control to decrease the brake fluid pressure generated by the hydraulic modulator H is not carried out, or in the case in which in step S5 the depressing force that is less than the first depressing force continues for the predetermined period of time and control to decrease the brake fluid pressure generated by the hydraulic modulator H is carried out, if in step S7 the depressing force increases and attains a third depressing force (e.g. 50 N), which is a threshold value, the flowchart returns to step S4, and braking with the brake fluid pressure generated by the master cylinder Cm in response to the depressing force and with the brake fluid pressure generated by the hydraulic modulator H is carried out. In this case, since the requirements of the subsequent step S5 are not established, control to decrease the brake fluid pressure generated by the hydraulic modulator H in step S6 is not carried out, and the hydraulic modulator H therefore generates a large brake fluid pressure that is commensurate with the increased depressing force.

If in step S8 the driver takes his or her foot off the brake pedal P2 and the braking operation ends, the flowchart returns to step S1.

As described above, in the 'regenerative braking restriction mode', in which regenerative braking of the electric motor M is restricted, when the driver continuously depresses the brake pedal P2 with a small depressing force that is less than the first depressing force while descending a long downward slope, since the brake fluid pressure generated by the hydraulic modulator H gradually decreases, it is possible to eliminate problems such as generation of operating noise, increase in the power consumption, and degradation in brake feeling accompanying frequent operation of the hydraulic modulator H while avoiding a sudden change in the braking force. Furthermore, if the depressing force increases and attains the second depressing force while carrying out control to decrease the brake fluid pressure generated by the hydraulic modulator H, the brake fluid pressure generated by the hydraulic modulator H does not decrease further, and the burden on the driver operating the brake pedal P2 is prevented from increasing excessively. Moreover, if the depressing force increases further and attains the third depressing force while carrying out control to decrease the brake fluid pressure generated by the hydraulic modulator H, the control to decrease the brake fluid pressure ends and the hydraulic modulator H generates its intrinsic brake fluid pressure, and when the driver strongly depresses the brake pedal P2, a sufficient braking force can be generated with the brake fluid pressure generated by the master cylinder Cm and the brake fluid pressure generated by the hydraulic modulator H.

On the other hand, if in the step S1 the battery B is not in a fully charged state and the regenerative braking of the electric motor M is not restricted, then in step S9 the notification device I notifies the driver of the 'normal braking mode'. Specifically, when there is a shift from the 'regenerative braking restriction mode' to the 'normal braking mode', the sound generation means is operated so as to notify the driver of the shift, and while the 'normal braking mode' is established the image display means of the meter panel notifies the driver thereof. This makes it possible to prevent a disagreeable sensation from occurring by notifying the driver in advance of a change in brake feeling due to the regenerative braking being stopped when there is a shift from the 'normal braking mode' to the 'regenerative braking restriction mode'.

If in the subsequent step S10 the driver is not depressing the brake pedal P2 and in step S11 the driver is not depressing the accelerator pedal P1, then in step S12 the electric motor M carries out regenerative braking to thus generate a regenerative braking force corresponding to the engine braking.

If in step S10 the driver is depressing the brake pedal P2 and in step S13 there is no sudden increase in the depressing force, then in step S14 hydraulic braking due to the brake fluid pressure generated by the master cylinder Cm and regenerative braking of the electric motor M are used in combination. If in step S13 there is a sudden increase in the depressing force or the depressing force attains a fourth depressing force or greater, then in step S15 hydraulic braking due to the brake fluid pressure generated by the master cylinder Cm, the upper limit regenerative braking, and hydraulic braking due to the brake fluid pressure generated by the hydraulic modulator H are used in combination, thus ensuring that there is a necessary braking force corresponding to the large depressing force.

An embodiment of the present invention is explained above, but the present invention may be modified in a variety of ways as long as the modifications do not depart from the gist of the present invention.

For example, the hydraulic circuit of the hydraulic modulator H is not limited to the embodiment.

What is claimed is:

1. An electric automobile braking device comprising a master cylinder to which a depressing force of a brake pedal by a driver is transmitted without being boosted and that generates a brake fluid pressure, and a hydraulic booster device that can increase the brake fluid pressure generated by the master cylinder with a brake fluid pressure generated by an electric oil pump,
   wherein switching is possible between a normal braking mode in which hydraulic braking and regenerative braking are used in combination when a percentage charge of a battery connected to an electric motor for traveling is less than a threshold value and a regenerative braking restriction mode in which hydraulic braking is permitted and regenerative braking is restricted when the percentage charge of the battery is the threshold value or greater, and
   in the regenerative braking restriction mode, when the depressing force of the brake pedal by the driver is less than a first depressing force over a predetermined period of time, an operation of the hydraulic booster device is suppressed.

2. The electric automobile braking device according to claim 1, wherein while the operation of the hydraulic booster device is being suppressed, the brake fluid pressure generated by the hydraulic booster device is gradually decreased until the depressing force of the brake pedal by the driver attains a second depressing force that is greater than the first depressing force.

3. The electric automobile braking device according to claim 2, wherein while the operation of the hydraulic booster device is being suppressed, the suppression of operation of the hydraulic booster device is released when the depressing force of the brake pedal by the driver attains a third depressing force that is greater than the second depressing force.

4. The electric automobile braking device according to claim 1, further comprising a notification device that notifies the driver of a shift from the normal braking mode to the regenerative braking restriction mode.

5. The electric automobile braking device according to claim 2, further comprising a notification device that notifies the driver of a shift from the normal braking mode to the regenerative braking restriction mode.

6. The electric automobile braking device according to claim 3, further comprising a notification device that notifies the driver of a shift from the normal braking mode to the regenerative braking restriction mode.

7. The electric automobile braking device according to claim 1, further comprising a notification device that notifies the driver of a shift from the regenerative braking restriction mode to the normal braking mode.

8. The electric automobile braking device according to claim 2, further comprising a notification device that notifies the driver of a shift from the regenerative braking restriction mode to the normal braking mode.

9. The electric automobile braking device according to claim 3, further comprising a notification device that notifies the driver of a shift from the regenerative braking restriction mode to the normal braking mode.

10. The electric automobile braking device according to claim 4, further comprising a notification device that notifies the driver of a shift from the regenerative braking restriction mode to the normal braking mode.

11. The electric automobile braking device according to claim 5, further comprising a notification device that notifies the driver of a shift from the regenerative braking restriction mode to the normal braking mode.

12. The electric automobile braking device according to claim 6, further comprising a notification device that notifies the driver of a shift from the regenerative braking restriction mode to the normal braking mode.

* * * * *